United States Patent [19]

Kuzara et al.

[11] Patent Number: 5,450,586

[45] Date of Patent: * Sep. 12, 1995

[54] SYSTEM FOR ANALYZING AND DEBUGGING EMBEDDED SOFTWARE THROUGH DYNAMIC AND INTERACTIVE USE OF CODE MARKERS

[75] Inventors: Eric J. Kuzara; Andrew J. Blasciak, both of Colorado Springs; Greg S. Parets, Loveland, all of Colo.

[73] Assignee: Hewlett-Packard Company, Palo Alto, Calif.

[*] Notice: The portion of the term of this patent subsequent to Nov. 23, 2010 has been disclaimed.

[21] Appl. No.: 876,346

[22] Filed: Apr. 30, 1992

Related U.S. Application Data

[63] Continuation-in-part of Ser. No. 744,849, Aug. 14, 1991, Pat. No. 5,265,254.

[51] Int. Cl.⁶ .................................................. G06F 7/00
[52] U.S. Cl. ................................... 395/700; 395/180; 364/275.5; 364/267.91; 364/267; 364/DIG. 1
[58] Field of Search .................. 364/DIG. 1, DIG. 2; 395/600, 500, 575, 700; 371/19

[56] References Cited

U.S. PATENT DOCUMENTS

| | | | |
|---|---|---|---|
| 4,802,165 | 1/1989 | Ream | 371/19 |
| 4,845,615 | 7/1989 | Blasciak | 364/200 |
| 5,047,919 | 9/1991 | Sterling et al. | 364/200 |
| 5,103,394 | 4/1992 | Blasciak | 395/575 |
| 5,121,501 | 6/1992 | Baumgartner et al. | 395/800 |
| 5,265,254 | 11/1993 | Blasciak et al. | 395/700 |

*Primary Examiner*—Paul V. Kulik
*Assistant Examiner*—Maria N. Von Buhr

[57] ABSTRACT

A system for inserting code markers for observing indications (external to the microprocessor upon which the software operates) of the occurrence of an event in the execution of the software. Additional instructions or markers are added to the software to be debugged to produce simple, encoded, memory references to otherwise unused memory or I/O locations that will always be visible to a logic analyzer as bus cycles. Although the code markers cause a minimal intrusion in the underlying software, they make tracing events by a conventional logic analyzer much simpler and allow for performance evaluations in manners not heretofore possible. The inserted code markers provide a method of dynamically extracting information from a running host or real-time "black box" embedded system under test using simple low intrusion print statements, encoded I/O writes on procedure entries and exits, and/or an interface to service calls and the like which writes out the passed parameters. The code markers are inserted at compile time or interactively during the debug session to make visible critical points in the code execution, such as function calls, task creation and semaphore operations, so as to speed isolation of problems at test points during debugging. Performance analysis and event analysis use the code markers to cut through the ambiguities of microprocessor prefetch and cache operations. Because of these features, the invention is particularly advantageous for use by software design teams developing complex embedded host or real-time operating systems using multi-task operating systems and/or object oriented systems.

16 Claims, 10 Drawing Sheets

| ADDRESS | DESCRIPTION |
|---|---|
| 0000 | VECTOR SPACE |
| .. | |
| 03ff | |
| 0400 | OPERATING SYSTEM |
| : : | |
| : : | |
| .. | |
| 1fff | |
| 2000 | USER FUNCTION1 |
| .. | |
| 204f | |
| 2050 | MARKER DEAD SPACE FOR FUNCTION1 |
| .. | |
| 2057 | |
| 2058 | USER FUNCTION2 |
| .. | |
| 2637 | |
| 2638 | MARKER DEAD SPACE FOR FUNCTION2 |
| .. | |
| 2660 | |
| .. | |
| .. | |
| .. | |
| .. | |
| 97f0 | USER FUNCTIONN |
| .. | |
| 9a5f | |
| 9a60 | MARKER DEAD SPACE FOR FUNCTIONN |
| .. | |
| 9af8 | |
| a000 | USER DATA SPACE |
| .. | |
| afff | |
| b000 | MARKER TYPE DEFINITION AREA (128 BYTES) |
| .. | |
| b004 | printmk_o |
| b008 | printmk_d |
| b00c | procmk |
| b010 | osmk_o |
| bo14 | osmk_d |
| b018 | usermk |
| .. | |
| b07f | |

*Fig. 7*

EXAMPLE OF CODE MARKER INSTRUMENTATION TO PRINT WRITES TO VARIABLE "a"

INSTRUMENTATION

| MEMORY ADDRESS | C SOURCE CODE | | FOR HW COLLECTION | FOR SW COLLECTION |
|---|---|---|---|---|
| 1000H | `funct_a(i,j)`<br>`int i,j;`<br>`{`<br>`a=i+j;`<br>`j=i*a;`<br>`for (i=0; i<j; i++)`<br>`{`<br>`a=j;`<br>`}`<br>`}` | --><br>--> | `funct_a(i,j)`<br>`int i,j;`<br>`{`<br>`a=i+j;`<br>`printmk_o=MK_ID0001;`<br>`printmk_d=a;`<br>`j=i*a;`<br>`for (i=0; i<j; i++)`<br>`{`<br>`a=j;`<br>`printmk_o=MK_ID0002;`<br>`printmk_d=a;`<br>`}`<br>`}` | `funct_a(i,j)`<br>`int i,j;`<br>`{`<br>`a=i+j;`<br>`tool (printmk_o,MK_ID0001);`<br>`tool (printmk_d,a);`<br>`j=i*a;`<br>`for (i=0; i<j; i++)`<br>`{`<br>`a=j;`<br>`tool (printmk_o,MK_ID0002);`<br>`tool (printmk_d,a);`<br>`}`<br>`}` |
| 1020H | `}` | | | |
| 1022H | `MDSfunct_a()`<br>`{`<br>`#pragma ASM`<br>`nop`<br>`nop`<br>`nop`<br>`nop`<br>`nop`<br>`#pragma END_ASM` | | [ OVERLAPPED DEAD AREA ]<br>`nop`<br>`nop`<br>`#pragma END_ASM` | `nop`<br>`nop`<br>`#pragma END-ASM` |
| 102AH | `}` | | `}` | `}` |

--> inserted code

Fig. 8

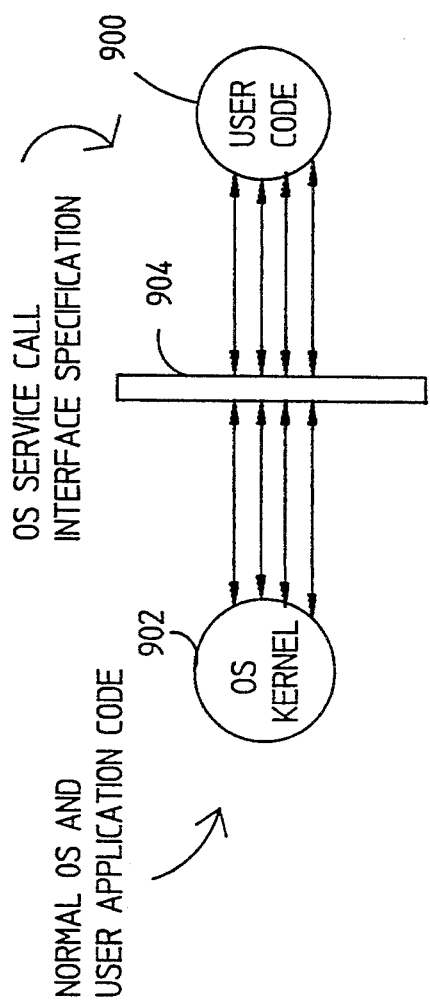

SYSTEM FOR ANALYZING AND DEBUGGING EMBEDDED SOFTWARE THROUGH DYNAMIC AND INTERACTIVE USE OF CODE MARKERS

CROSS-REFERENCE TO RELATED APPLICATIONS

This patent application is a continuation-in-part application of U.S. patent application Ser. No. 07/744,849, filed Aug. 14, 1991, now U.S. Pat. No. 5,265,254.

COPYRIGHT NOTICE AND AUTHORIZATION

A portion of the disclosure of this patent document (APPENDICES A, B, C and D) contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a system for analyzing and debugging software through dynamic and interactive use of code markers, and more particularly, to a system and method of using code markers to analyze and debug complex host computer and embedded "black box" type software systems including microprocessor based real-time operating systems, even those with on-board caches and queues, so as to eliminate most dependencies on particular processors and language systems.

2. Description of the Prior Art

In recent years, software has had increasing importance in the computer industry. Software is used to control many increasingly complex processes, and the software itself has accordingly become increasingly complex. Many tools have been developed for assisting a software engineer in the development of such complex software. Such tools include compilers, assemblers, linkers, editors and the like, as well as other specification and design tools, configuration management tools, language smart editors and the like. Other tools, such as microprocessor emulators, also have been designed for operation on general purpose computers to assist software engineers in the development of software. Such products have led to the developing discipline of Computer Aided Software Engineering (CASE).

One of the primary tasks of the software engineer is to analyze his or her code to determine whether the code operates as desired so that if an error is found, a debugging process may be conducted. Traditional debugging methods include slow manual processes such as inserting print statements into the software at particular locations so that the values of variables and the like may be checked to determine if they have the expected values. However, such an approach is no longer desired because it results in very high overhead and intrusion on the operation of the code being examined. Moreover, such print statements are difficult to use in embedded software systems because the target processor on which the software is to run must have a port for the printed statements to be communicated to the output. As known to those skilled in the art, embedded systems are software/hardware systems dedicated to an application which requires consistent and timely control of, and response to, external events. Embedded systems may also involve presenting information about those events and allowing user interaction with the parameters controlling the application. It is thus desirable to develop a debugging system which can be used to debug software having application specific I/O.

Software and hardware debugging systems have also been designed to assist the software engineer in the debugging process. However, such debuggers are generally restricted to use with particular language systems and, as a result, are static and non-real-time. Moreover, such debuggers are generally not widely available for embedded environments because of the unpredictability of external events to which the system responds.

However, a certain class of conventional debuggers deals specifically with debugging real-time operating systems (RTOS). Normally, each RTOS has a compatible debugger that intimately knows the inner workings of that particular RTOS. As such, the debugger can display the current state of the RTOS resources such as the number of messages in each mailbox, which events are currently pending, or the current run status of each task at any point in time. Unfortunately, debuggers can only display a snapshot of the RTOS at a given point in time and are not able to display the flow of operating system activity in a real-time manner as it changes over time.

To fill this need for real-time tracing of RTOS activity, some users have attempted to use traditional emulation trace analyzers or logic analyzers to capture microprocessor bus cycle information and then relate it back to the RTOS activity. However, these attempts have failed for two reasons. First, commercially available RTOSs are normally viewed as "black boxes" whose inner workings are hidden from the end user. This makes correlating the captured data to RTOS activity impossible. Second, the amount of bus cycle level trace data captured is too great to allow any high level view of RTOS activity. A normal trace buffer can capture only enough bus cycle level data for one or two RTOS transactions, which does not provide the long term flow of RTOS activity desired. Conventional debuggers for RTOS thus have been of limited utility.

As just noted, logic analyzers have been used by software engineers to aid in debugging their code by providing low level views of microprocessor bus cycles and other logical blocks within the system. However, such logic analyzers require intimate knowledge of the microprocessor on which the software is operating in order to allow the user to view the data. Moreover, the data is generally not visible if the processor has an on board cache and is difficult to extract if the processor uses queuing or pipelining as in graphics systems, for example. Thus, logic analyzers are generally not geared for use by software engineers and, accordingly, are not particularly user friendly to software engineers.

Other debugger technology has been developed to appeal to the abstraction level of high level language software engineers. For example, a product called Validate/XEL ™ has been provided to software engineers as an interface on top of an emulator which is designed to allow full speed emulation, modular architecture and high-speed downloads. However, such a system does not address the needs of large software design teams and cannot adequately handle rapidly increasing code sizes.

Another debugging tool which has been developed to assist software engineers is the Software Analysis Workbench (SAW). SAW hooks up to an IBM-Compatible PC-AT and ties to language tools in that environment. SAW can capture events in real-time and can monitor real-time execution without intrusion on the underlying software process. Unfortunately, SAW does not address the problems of caches and prefetched queues and does not eliminate most dependencies on particular processors and language systems.

An example of a tool for use with SAW is a system entitled TaskView®, which uses the instrumented Verdix operating system written for the ADA language to write out data that an analyzer can capture and display later. In particular, TaskView® provides software engineers designing embedded systems using ADA the ability to analyze performance at the system state and task levels, to acquire a high-level trace of application tasks and kernel activities and to perform measurements with the instruction cache enabled. TaskView® purportedly creates a comprehensive run-time view of a multitasking embedded system from a single in-target measurement. TaskView® works in conjunction with SAW to create high-level trace files and tables of performance data for application tasks and various components of the multitasking run-time kernel. This allows the user to determine how the performance of an application program is related to that of an instrumented run-time kernel.

TaskView® operates on a special, instrumented version of the Verdix operating system which must be purchased from the operating system vendor. The Verdix operating system includes measurement information which is provided by the vendor by inserting memory write instructions, known as instrumentation points, at certain locations in the operating system code and then writing these instrumentation points to the same predefined memory locations so that SAW may acquire the instrumentation output by monitoring the microprocessor address and data buses. TaskView® thus uses SAW to track the execution of embedded software and then post-processes the acquired data to extract performance and trace information. As a result, timing measurements may be made even in systems with instruction prefetch and instruction caching. The instrumented code also enables dynamic run-time information to be gathered which includes the size and location of memory allocation, exception source location and discovered handler, task identification and system call type.

To use TaskView®, the user must link his or her compiled application with the instrumented version of the run-time kernel. SAW must then be set up with a run-time event file for monitoring the instrumentation points. SAW then acquires the run-time data, and the file created by this measurement contains information on all entries to and exits from the kernel and the application tasks. TaskView® then takes this acquisition file and annotates it with symbolic information about the interrupt handlers and application tasks and produces a performance analysis and high-level trace views.

However, the use of TaskView® has been limited because it works only on Verdix ADA development systems, displays only certain parameters which are passed into the operating system kernel through a service call, and requires the user to buy a special, instrumented version of the Verdix operating system which has been preinstrumented by the vendor. A more flexible system is desired which enables the user to analyze and debug code as desired, even when the source code is unavailable and unknown to the user, for operating systems written in any computer language including assembly language. It is also desired to develop a system which may display any parameters desired by the user, including all parameters that are passed into the operating system kernel through a service call.

Accordingly, the prior art does not provide adequate general purpose means for analyzing and debugging complex host computer and embedded microprocessor based real-time operating systems and for cutting through the ambiguities of microprocessor prefetch and cache operations. Moreover, no prior art system is adequately designed to benefit software design teams developing large and complex embedded applications in any computer language which makes use of a multitasking operating system and/or object oriented systems with real-time requirements. The present invention has been designed to meet these needs.

SUMMARY OF THE INVENTION

The present invention meets the above-mentioned needs in the prior art by removing most microprocessor dependencies and making information visible even in microprocessors with caches and queues. The resulting method can be used across different language systems and for host or embedded real-time operating systems environments without significantly intruding into the user's software. The present invention also provides a faster turnaround time for the software engineer's debug cycle by automating a previously quite tedious process. This is accomplished using software code markers as a low intrusion method of communicating data of interest for debugging. Such code markers are typically inserted by the user at compile time or interactively during the debug session to make visible critical points in code execution such as function calls, task creation, semaphore operations and other resource usage so as to speed isolation of problems at test points during debugging of the user's software. Accordingly, unlike the aforementioned TaskView® system, the user is not limited to the code markers provided by the operating system vendor. As will be described herein, code markers inserted in accordance with the invention allow measurements including event tracing, software performance and system profiling to be conducted and presented to the software engineer as a system view at the desired level of abstraction.

As used herein, a code marker is an observable indication (external to the microprocessor) of the occurrence of an event in the execution of the software into which the marker is inserted. A code marker is the smallest standard microprocessor transaction required to communicate desired information to a chosen collection tool, thereby minimizing intrusion into the underlying software. Generally, higher level events and/or processors which contain instruction caches limit the intrinsic observability of these events. In these cases, additional instructions may be added to the software to produce simple, encoded, memory references to otherwise unused memory or I/O locations that will always be visible to a logic analyzer as bus cycles. Code markers thus cause some intrusion into the underlying software in time and space and also use a small portion of the microprocessor's address space, but such code markers make tracing events by a conventional logic analyzer much simpler. The encoded information in each code marker also may be post-processed to recover the nature of the event.

Inserted markers provide a method of dynamically extracting information which would be expensive and difficult to obtain directly from a running system under test. Use of code markers also makes the state and operation of the system externally observable at low cost and with minimal intrusion. Possible implementations of such code markers include a simple address access when fixed on non-prefetch machines, encoded I/O write on procedure entry and exit, low intrusion print statements, task table dumps, encoded process I/O for task switching and exception event occurrences. Low intrusion print statements are used in a preferred embodiment described herein. Such print statements are extensions of the code marker concept to include the run time dump of data. The low intrusion print statement is thus very similar to a conventional print statement, except that no formatting is done by the target processor. Instead, the code marker ID with the binary data for the print statement is block transferred to the host computer for post processing. This dramatically reduces the overhead of a print statement, especially when the data is collected by a high level logic analyzer. Low intrusion print statements are also advantageous in that no special tools are necessary to implement them other than libraries.

A preferred embodiment of the present invention is characterized by three features which make it particularly useful for analyzing and debugging embedded software systems such as embedded real-time operating systems (RTOS). The first aspect of the present invention comprises means for inserting code markers directly into the embedded system under investigation at compile time or indirectly by inserting the code markers into the interface library of the RTOS service calls. As used herein, the RTOS service call library is the interface layer between the user's application code and the operating system "black box". By calling the RTOS service call library when calling the RTOS, these code markers may be inserted without the user knowing the inner workings of the operating system. This is accomplished by writing out information at all entry and exit points into and from the RTOS "black box", thereby making the RTOS activity visible without having to know the inner workings of the specific RTOS. The information is then written out to a specific, contiguous marker data area, and the written information identifies not only which RTOS service call was called but also the input parameters, the output parameters and the return values to/from the RTOS.

The second aspect of the present invention involves the collection of the marker data using, for example, a conventional hardware analyzer. In particular, the hardware marker analyzer which captures the RTOS marker data in accordance with the invention is preferably a traditional emulation trace analyzer or logic analyzer with at least one address range qualifier, and when used to capture the RTOS marker data, the storing of trace states is qualified by setting the address range qualifier to capture only data written to the specified RTOS marker data area. This reduces the amount of trace information captured to only those states which indicate a change in RTOS activity, thereby minimizing the amount of bus cycle level trace data captured. In this manner, a long term trace of only RTOS activity can be captured by the hardware analyzer.

The third aspect of the invention involves decoding the captured marker data and displaying it in the native form of the operating system service call. Further decoding makes it possible to display some of the parameters and return values in the same mnemonics used by the RTOS vendor to describe the RTOS. This type of display makes it very easy for a software engineer to follow the RTOS activity resulting from execution of the application code.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which:

FIG. 7 illustrates the insertion of code marker "dead space" for each function of the software system.

FIG. 8 illustrates an example of code marker instrumentation to print writes to variable "a" for the hardware and software marker collection techniques described with respect to FIGS. 5 and 6.

FIG. 9 is a conceptual illustration of an adaptation of the present invention for analyzing and debugging the interaction between the user code and a real-time operating system kernel.

DETAILED DESCRIPTION OF THE PRESENTLY PREFERRED EMBODIMENTS

A system and method which affords the above-mentioned and other beneficial features in accordance with presently preferred exemplary embodiments of the invention will be described below with reference to FIGS. 1–11, where FIGS. 1–8 relate to analyzing and debugging software running on a host system and FIGS. 9–11 relate to analyzing and debugging a real-time system using the techniques of the invention. It will be appreciated by those of ordinary skill in the art that the principles of the invention may be applied in environments other than those specifically illustrated here. Those skilled in the art will also appreciate that the description given herein is for explanatory purposes only and is not intended in any way to limit the scope of the invention. All questions regarding the scope of the invention may be resolved by referring to the appended claims.

There are two basic elements necessary for analyzing software for debugging purposes. First, a library of software source generators (signal generators) is needed to stimulate the software unit under test in a repeatable manner. Such signal generators may take the place of other units that are not yet written or not yet verified so that software simulation may be used to model hardware systems which are not yet built. Secondly, software output receivers or analyzers are needed. Analyzers are models linked to the software unit under test in a simulation environment which can be replaced with hardware analyzers for repeating the test in the target system. A system incorporating these and other elements is shown by way of example in FIG. 1.

Figure 1:
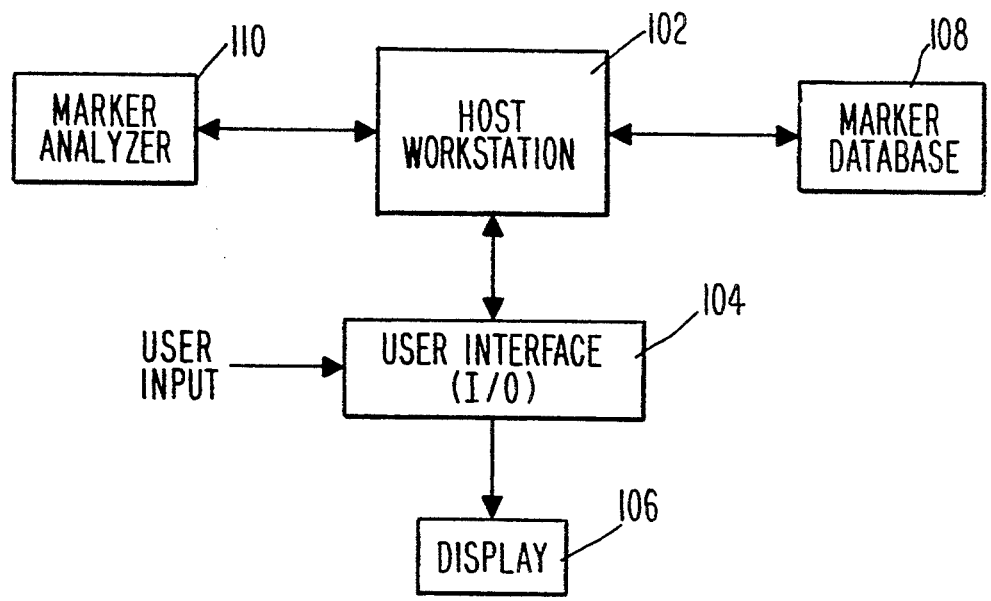
FIG. 1 illustrates in broad functional blocks the basic elements of the invention.

As shown in FIG. 1, a host workstation 102 in which software is being developed is accessed by the software engineer through user interface 104. During entry of the software and during debugging of the code, information is preferably displayed on display device 106. In accordance with the techniques to be described below, a marker database 108 and marker analyzer 110 are also provided for marking the software to be debugged with code markers for purposes of verifying time-based specifications and design margins of the software as well as performing simple, trustworthy, performance measurements. As will be described in more detail below, the code markers are written into otherwise unused I/O space in the microprocessor, thereby allowing execution to leave the microprocessor to thereby minimize intrusion in the software in both time and space. Code markers may also preferably be used to measure time domain activity such as task switching, function calls, and other software event and state changes. A first method of implementing such code markers will now be described with respect to FIGS. 2-8.

Figure 2:
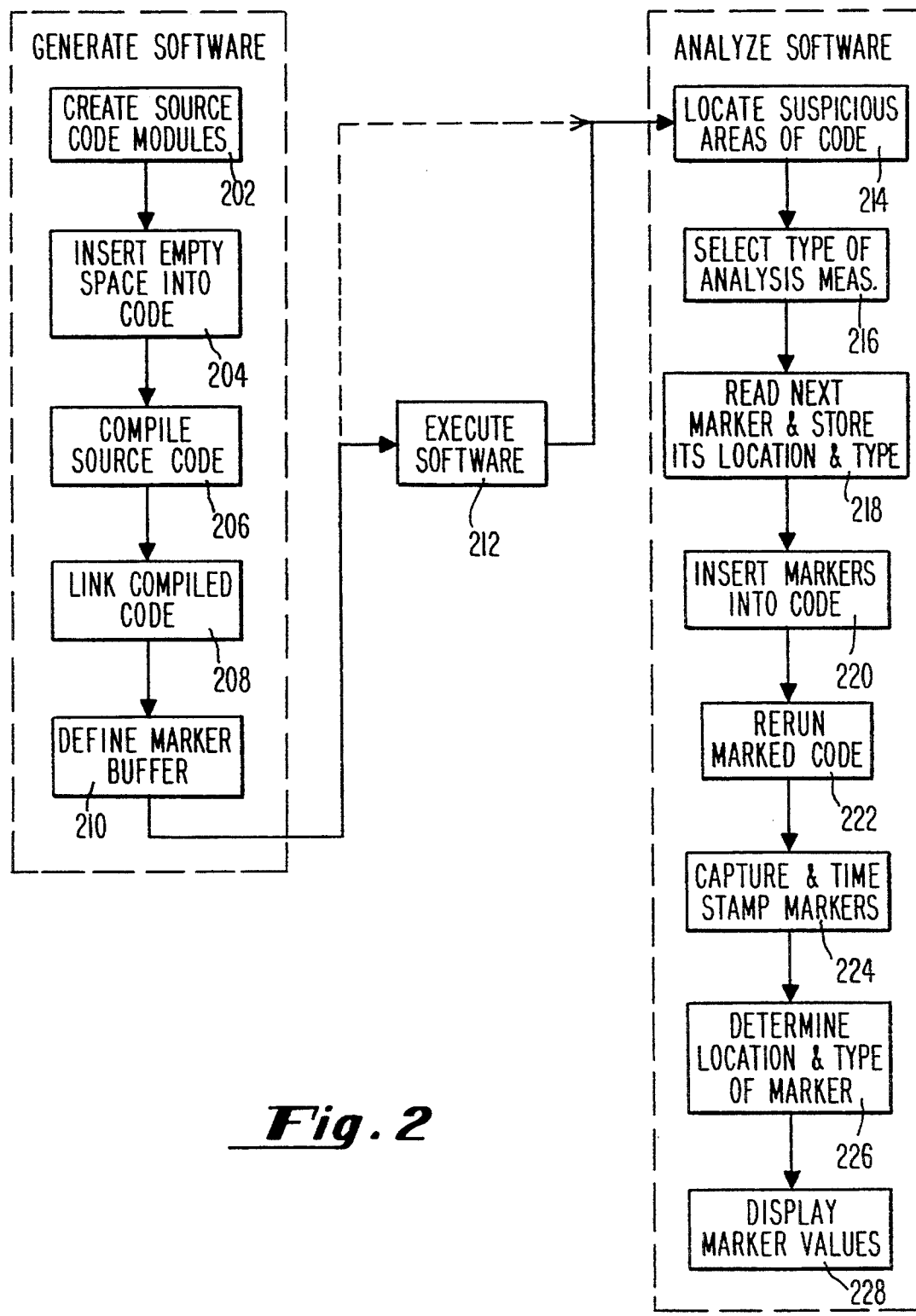
FIG. 2 illustrates a method of operation of the invention for analyzing and debugging software running on a host system, including the steps of generating the software, executing the software and analyzing the software in accordance with the techniques of the invention.

As shown in FIG. 2, the technique of the invention comprises three basic steps: generating software, executing the software, and analyzing the software. Generally, the software is generated beginning at step 202 by designing and generating source code modules from Computer Aided Software Engineering (CASE) tools of the software engineer. Then, as a first step to compiling a code module, a code marker instrumentation placeholding utility is run on the code at step 204 for inserting empty space into the code following each function of the code (see FIG. 7). This allows later addition of the code markers of the invention. The default size for the amount of space reserved may be determined by the size of the function, the number of parameters, the local variables of the code function and the like. However, the software engineer can choose options to increase this size if he or she wishes to have increased debugging capability or to eliminate it altogether. More details regarding this aspect of the invention will be given below with respect to FIGS. 3 and 4.

The code with the inserted spaces is then compiled at step 206. The software engineer may then link the code at step 208 and include one or more libraries that contain the marker data structures, thereby defining where the marker buffer resides in system memory at step 210. This marker buffer is preferably up to 128 bytes but can be reduced in size by only linking in the library for the particular debug measurements the software engineer wishes to perform.

The software generated as just described is then preferably loaded into the execution environment on the host processing system and run at step 212. The software engineer will then interpret execution results to determine if debugging is necessary. This step is separate from the analysis phase if the software engineer has some inherent way of determining proper functionality of his or her system. Optionally, as shown by broken line in FIG. 2, the software engineer may take the compiled code and go straight to the software analysis phase.

Upon entering the software analysis phase, the software engineer has decided that his or her code is not performing properly. The software engineer thus enters the analyzer environment, opens a code/structure/operating system browser window (if windows are available) and locates the suspicious area or areas of code at step 214. In a preferred embodiment, the user may pull down a menu to select the type of analysis measurement at step 216. For example, the type of analysis measurement may be "print variable" or "indicate exception event occurrence". The software engineer may then highlight or click on the desired variable(s) in the browser window. As each variable is selected, it is preferably displayed in the active specification window on display device 106. The software engineer may then select the menu command "process" or some such similar command so that the code marked by the software engineer is read by a marker insertion utility of the type described below with respect to FIGS. 5 and 6. The marker database 108 may then be queried by the insertion utility for the next unused ID code and tell the system database to log the location and type of code marker at step 218. The code marker is then inserted into the code at step 220, and the process is repeated for each requested marker. The size of the instrumented code is then checked against the reserved size (from step 204), and the code is downloaded to the execution environment. The software engineer then selects "execute" to start the analysis measurement and to rerun the marked code at step 222.

During execution, the code markers are captured and time-stamped and passed back to the measurement software (step 224). The measurement software then checks the code markers against the system database to determine location and type at step 226 and then displays the information as a trace list in the measurement results window as desired by the software engineer at step 228. As the software engineer scrolls through this trace list, the browser window may optionally track the corresponding source routines to show the code marker definition and placement. Other measurements may be similarly performed by selecting measurement type and identifying measurement events. For example, global measurements such as procedure flow can be defaulted to all or implemented by selecting specific procedures. The code markers may then be removed by simply reloading the modified code fragments from the original object.

Preferably, for ease of use, the code browsing tools described herein should have the same interface as the interface used for software code design and generation. Also, if a measurement is specified by pointing to some source or chart, preferably the software engineer does not have to open a different window to make changes.

When code markers have been placed in the code as described above, it will be necessary to update the symbol database as well in order to prevent other CASE tools from getting out of synchronization. This may or may not be sufficient depending upon how these other tools interact with the database. It also may be possible to provide limited code patching capability by relying on the reserved code marker area. This would trade off with the amount of debugging available for that software module.

As described above, the code marker techniques described herein may be used for many different measurements on the underlying software. For example, performance may be measured by determining the time spent in a particular code function, task or other module including or excluding the module's children. Code markers may also be used to count the module usage and event occurrence or to profile performance by indicating the relative and absolute times spent in each of a list of code modules of the software. Moreover, by using time stamps, code markers may be used to determine the elapsed time from event A to event B. Operating system interruptions such as process switches also may be included or excluded from such measurements.

Event flow analysis may also be measured using code markers in accordance with the techniques of the invention. In particular, the code markers of the invention may be used for a time-stamped trace of low intrusion print statements with or without data and to provide a time-stamped trace list of variable accesses. The code markers may also be used for a time-stamped execution flow including module entry and exits, task switches and the like. Other parameter contents may also be monitored, such as break points and branch flow of the underlying software. Implementation of such measurements are believed to be well within the skill of those skilled in the art and thus will not be described in more detail herein.

The code markers herein described preferably consist of 32 bits of data and 5 bits of type information. Examples of such marker types include procedure markers, low intrusion print statements, the data for low intrusion print statements, procedure data entry, events and event data, branches, operating system markers, operating system data or external user defined markers. The data contained in the marker data field will be dependent on the marker type. For example, for a code marker structure for the type "procedure", the code marker may comprise a bit to indicate whether the current code marker is an entry or exit code marker, 16 function bits representing the instrumented function, and 15 task bits which represent the instrumented task or object.

For the hardware marker collection method described below with respect to FIG. 6, code markers will require a 128 byte area in the user's address space. This will allow for 32 marker types, and the most significant 25 address bits may specify the code marker base address. The code marker thus can be written to this area using common move type processor instructions. On the other hand, with a software marker collection method described below with respect to FIG. 5, the code markers can be written to a software collection area via a system call having the following form:

Void tool(marker type, marker data)
U int32 marker type;
U int32 marker data.

Of course, other techniques may be implemented by those of ordinary skill in the art in accordance with the detailed description given below with respect to FIGS. 5 and 6.

As described above, code generated by the system engineer is instrumented such that it has spaces at the end of each function prior to compiling, thereby providing space for the insertion of code markers. There are two methods for such code instrumentation in accordance with the techniques of the invention: reverse engineering of the functions at the machine level (FIG. 3) and dynamic linking of the functions at a high level (FIG. 4). Each of these methods has advantages and drawbacks, and unfortunately, neither method is totally language or system independent. As will be described below, the ideal solution may be a combination of the two. In any event, both of these methods assume the existence of the aforementioned "dead area" following each function (as was inserted above in step 204). This "dead area" is inserted by a logic system design tool prior to the compile step as described above. The "dead area" may contain code or data or nops which are not referenced during the normal flow of the underlying program.

Figure 3:
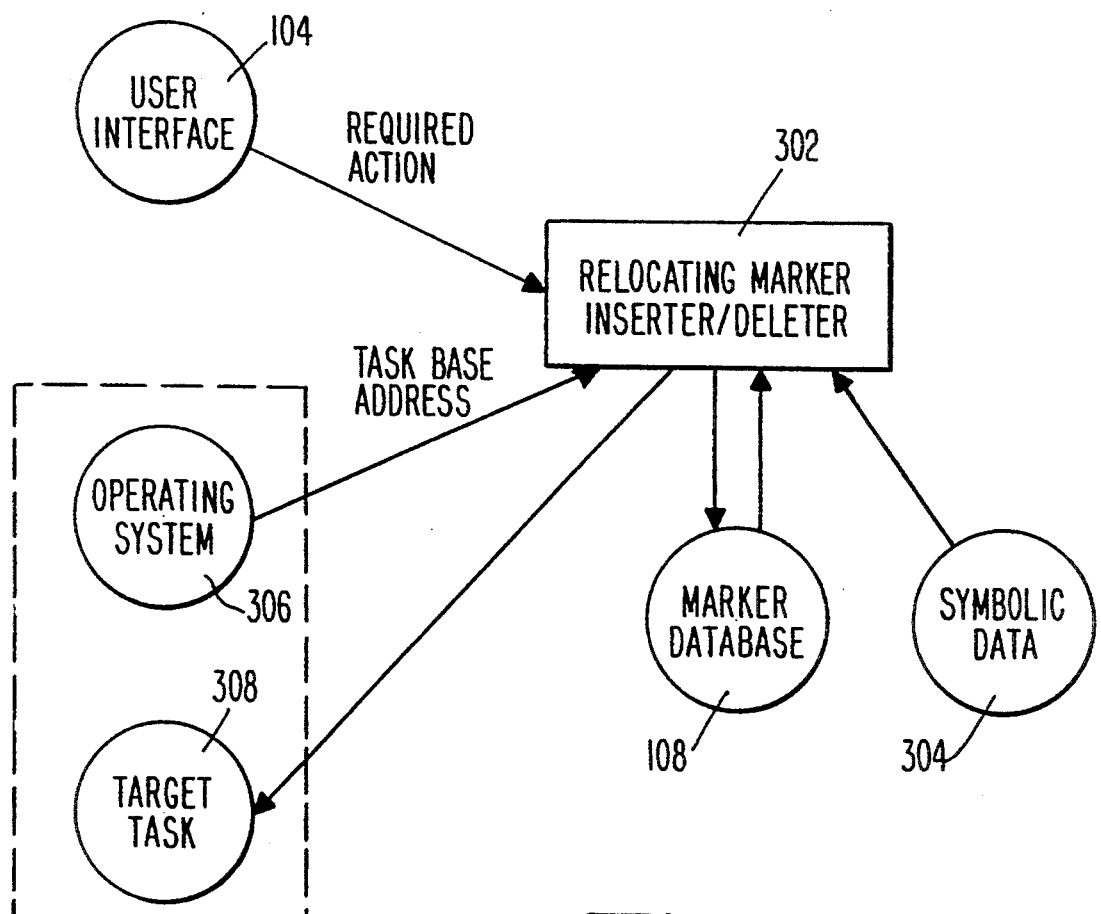
FIG. 3 illustrates a software code instrumentation technique illustrating reverse engineering of the software functions at the machine level.
Figure 4:
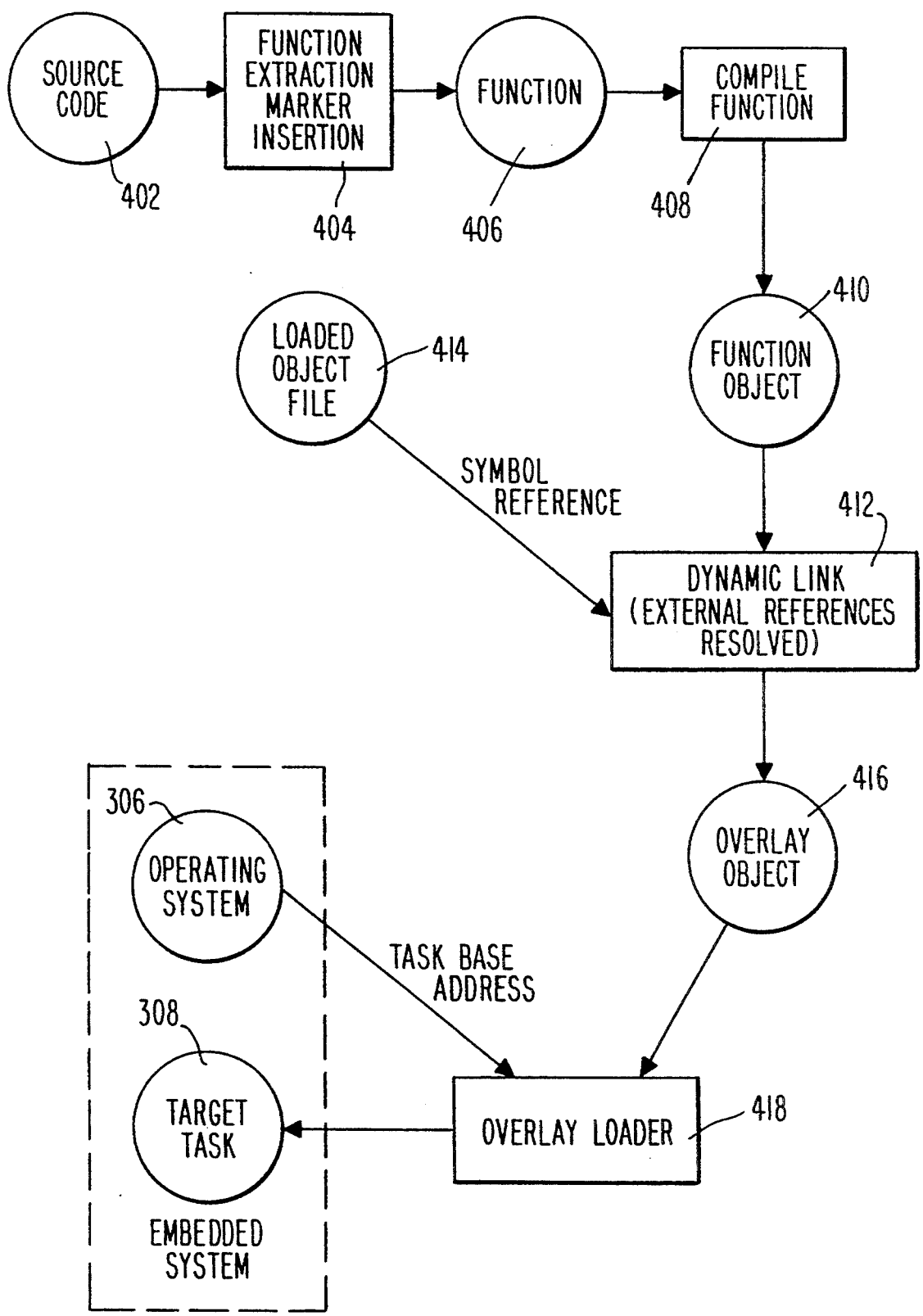
FIG. 4 illustrates another possible method of software code instrumentation using dynamic linking of the software functions at a high level.

FIG. 3 illustrates the reverse engineering code instrumentation technique at the machine level. This method relies on an expert knowledge of the processor instruction set. When it is desired to insert a code marker, a logic system design tool may scan the function at the machine level to interpret the variable flow. The code marker may then be inserted at the required position, and all code following the code marker would be moved down. All "local" branches would be relinked on the fly. A database of inserted marker positions would then be generated so that the code markers could be removed very quickly. Also, if the "dead area" contains positions of the local variables, then no knowledge of the stack frame would be required.

In particular, as shown in FIG. 3, the software engineer may input a required action via user interface 104 to a relocating marker inserter/deleter 302. Relocating marker inserter/deleter 302 communicates with marker database 108 to extract code markers for insertion in the software at the locations specified by the software engineer. Symbolic data 304 such as IEEE 695 data may then be modified or updated to prevent the other logic system design tools from getting out of synchronization as described above. As shown, the relocating marker inserter/deleter 302 operates by receiving the software task base address from the operating system 306 and inserting the code markers at the appropriate location within the target task 308. The code markers which are captured and displayed during the software analysis then may be used by the software engineer for debugging the underlying system.

Such a debugging method is advantageous in that no knowledge of the language system is required. It is potentially very fast, and all operations are done in the software engineer's program memory without reloading. However, such an approach requires a detailed knowledge of the microprocessor's instruction set since the program is almost a simulator. Also, such an approach makes it difficult to handle jump tables correctly without user interaction, and optimized code may be a problem. In any event, reverse engineering of the functions at the machine level may be accomplished as one preferred method of code instrumentation in accordance with the techniques of the invention.

The dynamic function linking method illustrated in FIG. 4 makes use of the compiler to rebuild functions after the insertion of the code markers of the invention. In such a case, the software engineer would indicate where the code marker is to be placed. A tool will then extract the function from the source code 402 and insert the marker at step 404 to obtain function 406. The software engineer will then call the compiler to compile the function at step 408 to produce an object file 410. Any external references of the function may then be resolved by a dynamic linker 412 which links in symbol references from a loaded symbol object file 414. The resulting overlay object file 416 may then be overlayed on top of the existing function in memory at step 418.

The dynamic linking approach has several advantages. Namely, no intimate knowledge of the processor is required, the markers can be placed anywhere with no help from the software engineer, and it is less complex. However, the recompiling and reloading of the function may be slow. Also, such an approach is dependent on the object file format, which is troublesome since there is no established standard for object files. In any event, the dynamic linking of functions is a preferred method in accordance with the invention for rebuilding functions after the insertion of markers.

Both of the code instrumentation techniques described above with respect to FIGS. 3 and 4 require a fairly complex piece of software. The reverse engineering tool requires a relocating marker inserter/deleter 302, while the dynamic relinker requires code to parse the object file, resolve external references and reload. Both tools also require a fairly involved user interface. Also, as known to those skilled in the art, both approaches require access to program memory, which infers some form of monitor or hardware access to user memory. In addition, if the embedded operating system 306 has relocated the code, then a physical base address must be supplied as shown in FIGS. 3 and 4. This implies some type of link with the operating system 306.

However, as noted above, a solution combining both methods may be constructed to solve these problems. For example, reverse engineering may be used to insert markers which are global in nature. These markers may be used for procedure entry/exit and also for procedure flow. This limits the scope of the reverse engineering tool and simplifies its construction. Also, performance of marker insertion is kept high by eliminating the compile/reference step required by dynamic linking. Dynamic linking may then be applied for user inserted markers such as low intrusion print statements. This would place the burden of variable referencing and code insertion on the compiler. Both of these methods thus provide useful techniques for inserting the code markers of the invention where they will be of most use.

Figure 5:
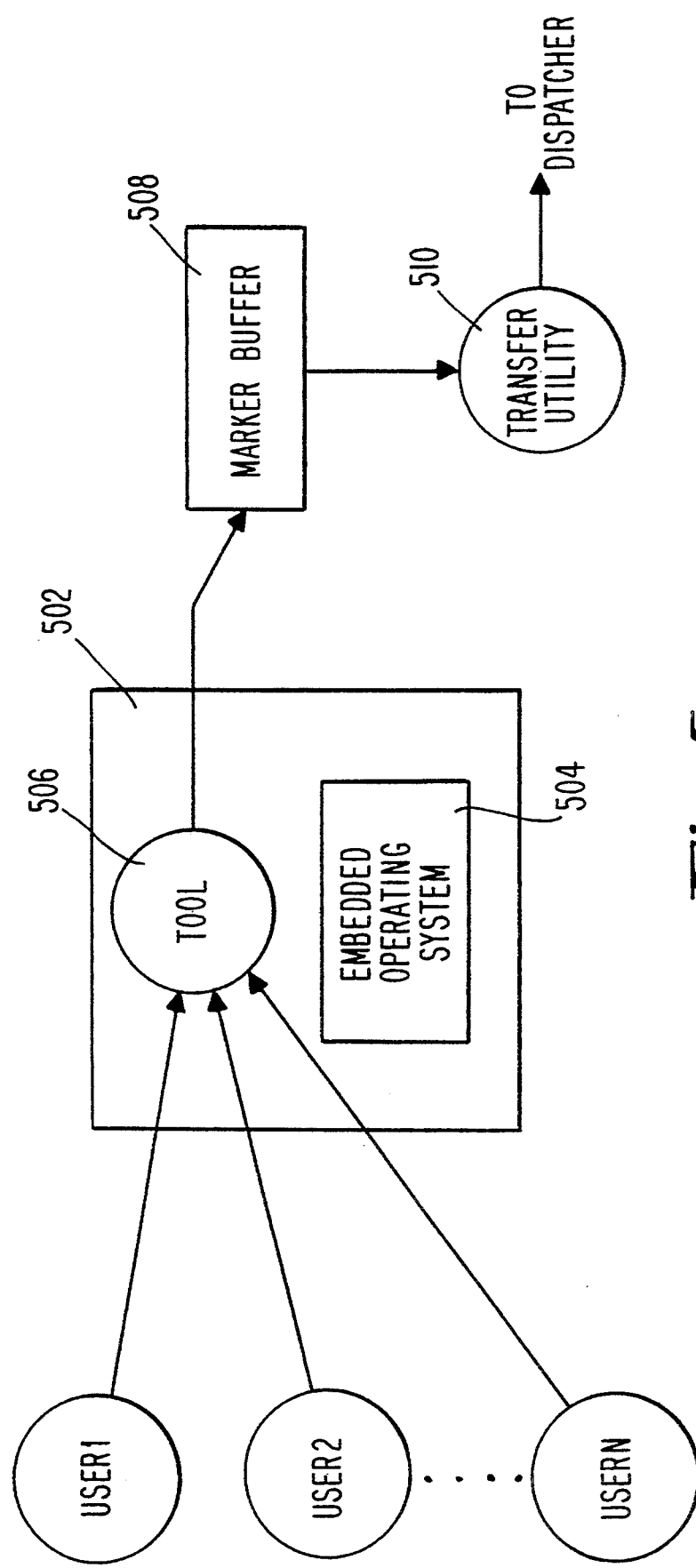
FIG. 5 illustrates a software method of marker collection in accordance with the techniques of the invention.

FIG. 5 illustrates a software method of marker collection (step 224) in accordance with the invention. Such a software method is generally preferred in that it is inexpensive and flexible. As described herein, marker collection is the technique of reading a stream of code markers (events), processing the code markers, acting on the code markers and transmitting the code markers to a dispatcher for subsequent display on the display device 106. The software marker collection method shown in FIG. 5 is implemented as a group of functions for code marker collection which requires no custom hardware and can be executed in software simulators. When executing in the software engineer's target system, it makes use of a communications port to the host computer. However, because this method does not use custom hardware, the CPU cycles to process the code markers must be taken from the target CPU, thus causing a higher level of time-based intrusion than a hardware marker collection method. However, as noted above, software marker collection is relatively inexpensive to implement and should be applicable to all execution environments.

During operation of the software marker collection system of FIG. 5, the software engineer writes the code for his or her software system. The source code is then run through a utility which pads the code with growth space between functions as described above with respect to FIG. 2. The code is then compiled and loaded, and once the code is running, the software engineer may browse his source code and select a measurement which causes the code instrumenter (FIGS. 3 and 4) to insert code markers in appropriate places for the measurement. Once this is accomplished, the code markers are inserted in the form of a call to the host processor 502 having an embedded operating system 504 and an operating system routine called "TOOL" 506. The growth space between functions allows each function to grow as markers are inserted using TOOL 506. The marker collection process TOOL 506 collects, processes and transmits the code markers from the user programs to a marker buffer 508 for transfer to a transfer utility 510. Presentation software then takes over and displays the result of the measurement using the code markers.

The software TOOL 506 that collects the code markers is generally responsible for at least four things. Namely, TOOL 506 gathers code markers and state information associated with the code markers as they are received from the software engineer's software system. The code markers are also time stamped if possible and then transmitted with their data to their host processor in an efficient manner. The code marker stream is also processed to make decisions to send status to the software engineer's software system if desired.

As shown in FIG. 5, code markers in the software engineer's code take the form of a call to TOOL with two parameters: (1) the address or type information and (2) the encoded data (see FIG. 8). These two parameters are necessary and sufficient for the transfer utility 510 to decode the code markers before they are sent to the display. The function TOOL 506 must take as little time from the software engineer's software system as possible, and is accordingly implemented as a non-preemptable operating system service which time stamps and places each marker into the marker buffer 508 in accordance with techniques known to those skilled in the art.

The marker buffer 508 is preferably a FIFO queue which stores the markers in raw form as they wait to be read by the transfer utility 510 for display. Transfer utility 510 takes code markers from marker buffer 508 and transmits them to the dispatcher for display. Transfer utility 510 is generally given a lower priority than the software engineer's software so that it runs in what would normally be idle machine cycles in the noninstrumented system. The transfer utility 510 can, however, be given a higher priority if the marker buffer 508 becomes full. TOOL 506 is preferably responsible for keeping the marker buffer 508 from overflowing. For example, if TOOL 506 finds the marker buffer 508 full when it tries to write a code marker, it preferably triggers the transfer utility 510 to transfer some code markers to the host processor for display, thereby further emptying marker buffer 508.

Figure 6:
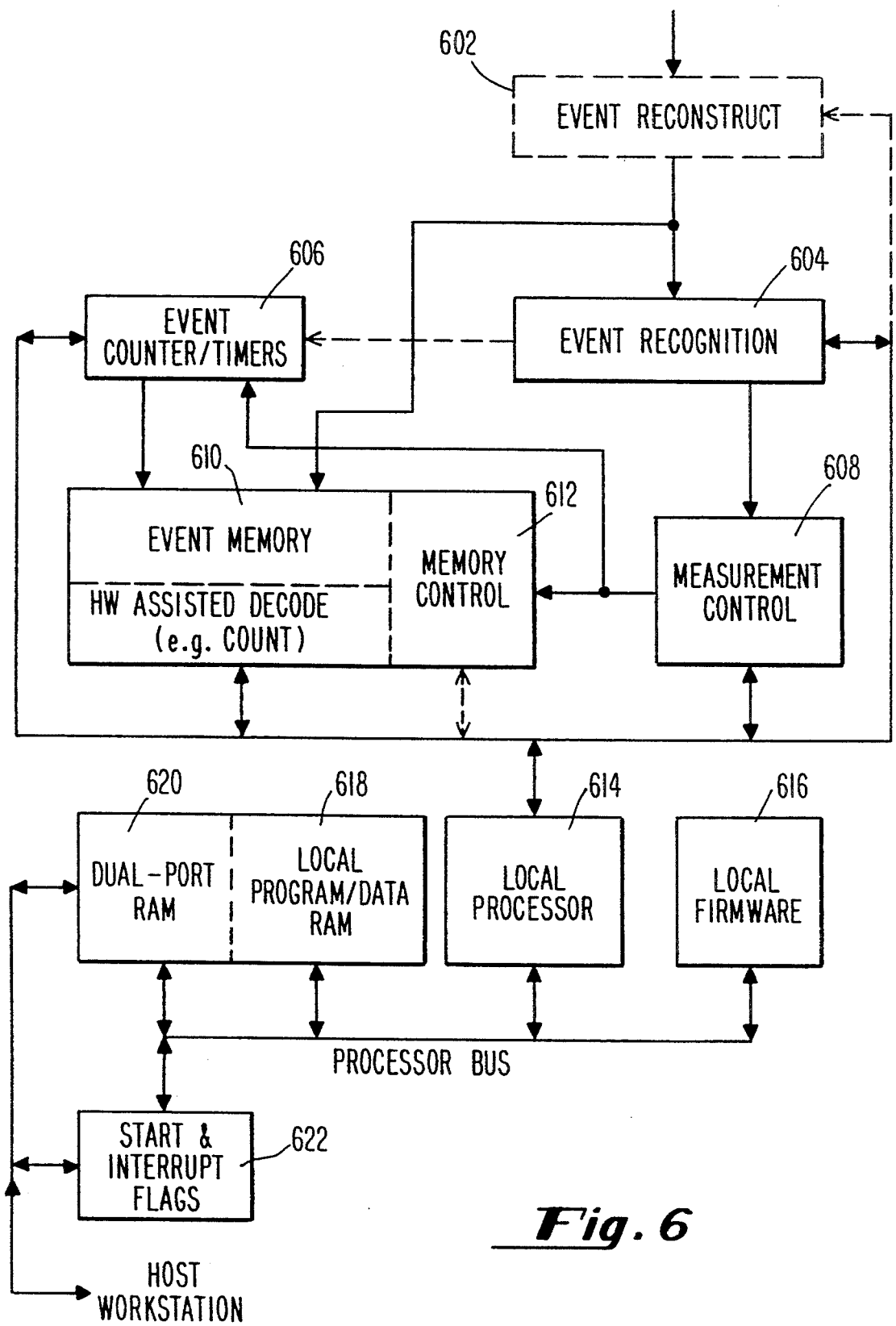
FIG. 6 illustrates a hardware method of marker collection in accordance with the techniques of the invention.

FIG. 6 illustrates a hardware analyzer circuit for implementing a hardware method of marker collection in accordance with the techniques of the invention. The hardware analyzer for marker collection illustrated in FIG. 6 provides a solution with much lower intrusion than the software collection method described above. It also provides high performance, since instead of requiring a special function call to time-stamp and pass markers to a collection buffer in memory, the code markers are instrumented as writes to memory at defined addresses while the hardware captures and time-stamps the code markers in real time in a manner similar to a standard bus analyzer. This greatly reduces the execution speed intrusion and requires only the basic code marker place holding space in the software engineer's code and does not include the extra code marker processing code in the software engineer's software. The hardware analyzer also may include local processing to provide data reduction for many measurements. Such hardware collection is primarily aimed at the embedded execution environment where all or part of the target software is being executed in the target hardware and the added intrusion of the software collection methods may not be acceptable.

The hardware code marker analyzer of FIG. 6 requires a preprocessor to connect into the software engineer's software target system at a point where the instrumented markers are visible. The most direct point would be through the processor pins of the target microprocessor, but it may also be available on a backplane or communications port. The analysis system must also have access to a channel where run control and high-performance memory access are provided in order to overlay the instrumented code fragments. This may be supplied by an emulator or simply a communications port to an onboard hardware monitor or the embedded operating system.

The circuit of FIG. 6 takes data from the preprocessor/interface at an event reconstruct block 602, and the output of the circuit of FIG. 6 communicates collected and reduced data back to the host platform for further processing and presentation to the software engineer. In particular, the data stream is received at event reconstruct block 602 and may be in various byte/word-/longword widths depending on the processor and the design of the particular target system. During event reconstruction, several code markers are reconstructed into one as when four byte cycles are needed to reconstruct one 32-bit marker. Event reconstruct block 602 thus reformats the data field to a specific width such as 32 bits and simplifies the recognition and control hardware that is needed. Such a function may be provided by the preprocessor interface, and accordingly, event reconstruct block 602 is shown in phantom.

The output of event reconstruct block 602 is then provided to event recognition circuit 604 and to event memory 610. Event recognition circuit 604 utilizes pattern recognition in order to isolate code markers from the rest of the data stream received at an input thereof as well as to identify types of code markers or specific code markers for control of various measurements. Preferably, the upper address bits of the code marker space are defined and fixed, and if it is contiguous, it will be the same for all code markers, thereby reducing complexity. The lower address field and status field may also require recognition logic to identify a set number of events for measurement control. This part of the circuit must be fast enough to allow the fastest data write rate of the processor or software system being analyzed.

Event counter/timer 606 is also provided for event counting and duration type measurements which require a set of counter/timers to start and stop on specific events. Event counter/timer 606 preferably also handles the time stamping function for standard event tracing. Preferably, measurement control state machines 608 are also provided to take inputs from the event recognition circuit 604 and the counter/timer logic circuit 606 to control event storage and other measurement dynamics. Measurement windowing and sequencing (as necessary) are handled by measurement control block 608. Signals of particular events may also be driven out for use by external hardware as desired.

Event storage in accordance with the invention is accomplished through a block of FIFO memory in event memory 610 that takes code marker data and counter/timer information as input data under control of memory control 612 and is dynamically unloaded by a local processor 614 for data reduction. The lower address field, data field and timer data are also stored. As shown, hardware assisted decoding logic may also be added to assist in the decoding of the stored data, such as gray to binary count translation, so as to increase performance of data reduction prior to display. In a preferred embodiment, event memory 610 comprises a large FIFO buffer which stores a code marker if measurement control block 608 determines that the input code marker is to be stored. Preferably, the FIFO buffer comprises two kilobytes of high speed FIFO to operate as a buffer and a deeper FIFO having at least 500 kilobytes connected to the smaller buffer. The output of the deep FIFO is then output to local processor 614 for data reduction in which certain code markers may be thrown out.

The local processor subsystem comprising elements 614–622 preferably accomplishes configuration and control of the basic measurement hardware by dynamically monitoring measurements and unloading and processing/reducing data before transmitting the reduced data to the host workstation for display. For this purpose, local firmware 616 is connected to the local processor 614 over a processor bus and connected to local program/data RAM 618 and dual-port RAM 620 for communication through a port to the host workstation. A start and interrupt flag register 622 may also be provided so that communication to the host workstation may be managed through interrupts, flags and the dual-port RAM 620 in accordance with known techniques. Such a high-speed communication channel to the host is needed to maintain system performance due to the amount of measurement data being passed. In preferred embodiments, the output of the dual-port RAM 620 and start and interrupt flag register 622 thus may be connected to a local area network which hooks into one or more workstations.

FIG. 7 illustrates the technique of the invention whereby code marker dead space is inserted for each function within the software engineer's system and a code marker type definition area is provided. These marker types may include the types described above.

FIG. 8 illustrates an example of code marker instrumentation to print writes to a variable "a" using the hardware and software code marker collection techniques of the invention. In particular, as shown, the simple user code in the leftmost column is modified for hardware collection to include low intrusion print statements which print the inserted code markers, their associated values, and other variable values such as, in this case, the variable "a". When software collection is used, on the other hand, the aforementioned TOOL instruction is instead called and given the variables printmk 0 as type information and MK ID001 as encoded data. Values for the variable "a" may also be passed to subroutines as indicated. As shown in FIG. 8, the user's software program is extended to include the print statements, but this poses no problem since the inserted dead space allows such expansion. If desired, this dead space may be removed once the debugging process has been completed.

A second method of implementing code markers for use with embedded software systems such as real-time operating systems will now be described with respect to FIGS. 9–11.

When used with embedded software, such as real-time operating systems, a different embodiment of the invention is provided which includes an operating system service call interface 904 between the user code 900 and the operating system kernel 902 as illustrated in FIG. 9. In particular, as will be described in more detail below, an alternative embodiment of the present invention includes an interface 904 between the operating system kernel 902 and the user code 900 for capturing the code markers with minimal intrusion upon the operation of the operating system kernel. As will be apparent to one skilled in the art, this interface design is necessary only in those instances where the operating system kernel is a "black box" and hence cannot be directly debugged using the techniques described above. However, as will be appreciated by those skilled in the art, this may often be the case since operating system software is often provided to a user only as object code or the particulars of the operating system are otherwise unknown to the user.

Figure 10:
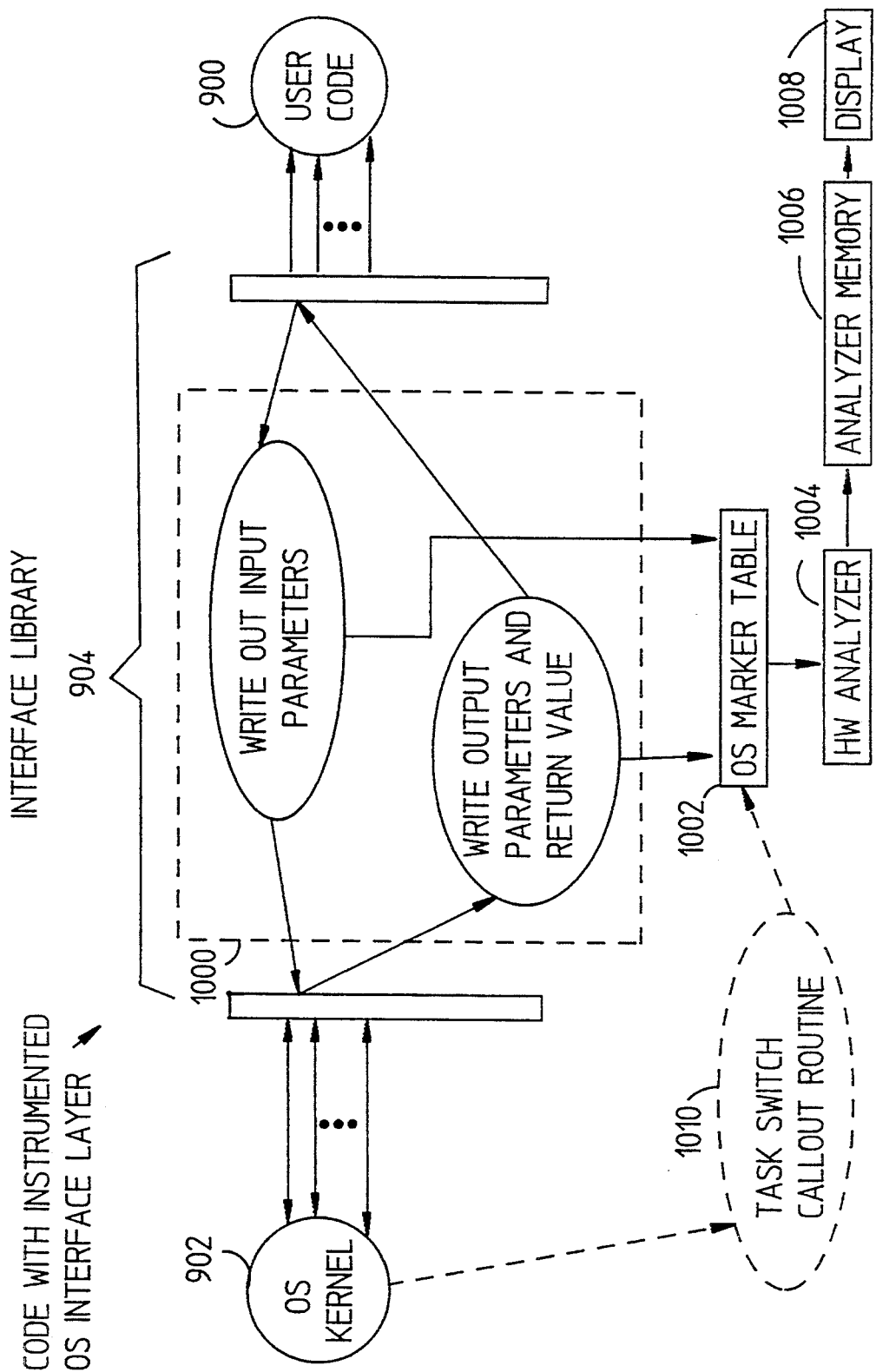
FIG. 10 illustrates a system for capturing code markers passed between the user's code and the real-time operating system kernel in accordance with the techniques of the invention.

FIG. 10 illustrates the interface 904 of this embodiment of the invention in more detail. As shown, the interface 904 includes an interface library 1000 which writes out input parameters provided in an operating system service call from user code 900 to kernel 902 and writes out output parameters and return values from kernel 902 which are returned to the user code 900 after completion of the service call. The input and output parameters and the return value are written to an operating system marker table 1002 as illustrated. Preferably, OS marker table 1002 is stored in a predetermined portion of the address space of the microprocessor of the system running the system of the invention, which in a preferred embodiment operates on a UNIX® workstation. This portion of the address space is monitored by a hardware analyzer 1004 and written to an analyzer memory 1006 for display on display 1008. Since only this address space needs to be monitored, the trace list may be limited to only the desired analysis and debugging information. In a preferred embodiment, hardware analyzer 1004 is an Emulation Bus Analyzer or a Software Performance Analyzer available from Hewlett-Packard Corporation. As will be described in more detail below, hardware analyzer 1004 decodes the captured code marker data and displays it in the native form of the operating system service call. Further decoding by the hardware analyzer 1004 also makes it possible to display some of the encoded parameters and return values in the same mnemonics used by the RTOS vendor to describe the RTOS. Those skilled in the art will also appreciate that the hardware analyzer 1004 may be any conventional hardware analyzer known to those skilled in the art.

In the embodiment of FIG. 10, the majority of the functionality comes from the interface library 1000. Namely, during operation, the user code 900 calls into the interface library 1000, and the interface library 1000 writes out marker data representing the service call and input parameters and then calls into the desired operating system kernel 902 service call. When the service call is completed and returns from the kernel 902, the interface library 1000 again writes out code marker data for the output parameters and return values and then returns to the user code 900. In a preferred embodiment, this action is transparent to the software engineer.

However, the embodiment of FIG. 10 may also include another piece of code which works in a slightly different manner than that just described. Namely, a task switch callout routine 1010 may be provided which is not called directly by the user code 900. Instead, a pointer to task switch callout routine 1010 is passed into the OS kernel 902 at system start-up. At execution time, whenever the OS kernel 902 switches out of one task and into another task, the OS kernel 902 calls the task switch callout routine 1010, which then writes out code marker data to the OS marker table 1002 indicating which task is being exited and which task is being entered. After writing to the OS marker table 1002, the task switch callout routine then just returns back to the OS kernel 902 to complete the task switch. Since this feature of the invention involves some intrusion into the operation of the operating system kernel 902, its use is optional.

In order for the task switch callout routine 1010 to indicate which tasks are being exited and entered, and therefore which code marker data is written to the OS marker table 1002, the following steps are taken. First, two unique task identifiers are passed to routine 1010 from the OS kernel 902 at execution time. Next, these identifiers are used by the task switch callout routine 1010 in one of two methods. In some cases, the identifiers are written out directly as code marker data indicating which task is being entered and exited. In a preferred embodiment, the task switch callout routine 1010 uses those identifiers to locate the more human readable ASCII task names contained in the internal OS kernel 902 data area. Appendix A is an example of a task switch callout routine 1010 which performs this method by simply offsetting into the data area pointed to by the task identifier. Once located, these ASCII task names are then written out as the marker data showing which tasks are being entered and exited. This data is then decoded in the display 1008 to appear as easily readable ASCII task names.

Figure 11:
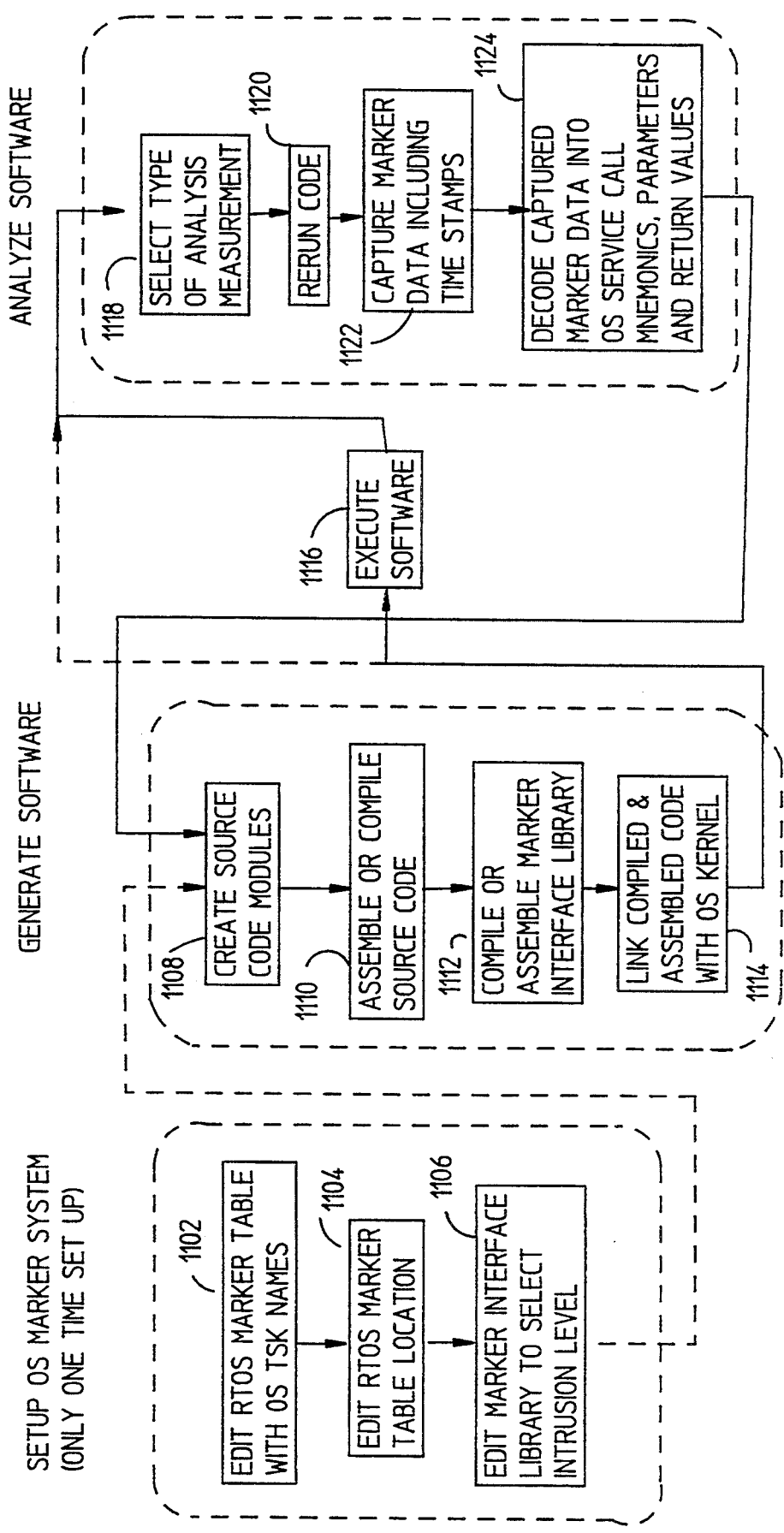
FIG. 11 illustrates a method of operation of the invention for analyzing and debugging a real-time operating system, including the steps of setting up the code marker system, generating the software, executing the software and analyzing the software in accordance with the techniques of the invention.

FIG. 11 illustrates the operation of the interface of FIGS. 9 and 10. As shown in FIG. 11, the technique of this embodiment again comprises the three basic steps of generating the software, executing the software and analyzing the software as in FIG. 2. However, the technique of this embodiment of the invention may further comprise a setup step that the user may choose to do if he or she wants the full measurement capabilities of the invention. This setup step is not required but may be preferred in order to facilitate easy debugging and testing. The operating system marker system need only be set up once prior to run-time operation. To setup the OS marker system, the user simply edits the source files supplied with the invention for three things. First, at step 1102, the user enters the operating system's task names into the OS marker table 1002 for those operating system task names that are going to be used by the user code 900. Second, at step 1104, the user may alter the OS marker table 1002 data location to place it somewhere other than the default location in the address space of the microprocessor. This allows the data area to be placed somewhere in the processor's address space that does not have actual memory components behind it since the marker data is captured by the hardware analyzer 1004 and it is not necessary for the marker data to be stored in host system memory. This allows the OS marker table 1002 to not take up any of the host system's memory. The user can then edit the marker interface library 1000 at step 1106 to eliminate some of the measurements that cause more intrusion on the user's systems than the basic measurement set if he or she desires. For example, the user may choose to enable or disable task switch routine 1010 in accordance with the performance requirements of the operating system kernel 902.

The software is then generated beginning at step 1108 by designing and generating the desired user code 900 from computer aided software engineering (CASE) tools of the software engineer. After the creation of the user code 900 at step 1108, the user then compiles or assembles the user code 900 at step 1110 and then compiles or assembles at step 1112 the marker interface library 1000 and other assembly code source files he or she may have edited during the aforementioned setup step. All of the resulting code is then linked in with the operating system kernel 902 at step 1114 to form the final application binary module, thereby forming a code marker library for capturing the marker data structures in a manner similar to that described above with respect to FIG. 2.

The software generated as just described is then loaded into the host processing system and executed in the execution environment on the host processing system at step 1116. The software engineer will then interpret execution results to determine if debugging is necessary. This step is separate from the analysis phase if the software engineer has some inherent way of determining proper functionality of his or her system. Optionally, as shown by broken line in FIG. 11, the software engineer may take the compiled code and go straight to the software analysis phase.

Upon entering the software analysis phase, the software engineer has decided that his or her code is not performing properly. The software engineer then enters the analyzer environment by selecting at step 1118 what type of analysis measurement is desired. The system then sets up the hardware analyzer 1004 to capture the appropriate marker data by watching the corresponding addresses in the OS marker table 1002. As in the embodiment of FIG. 2, the step of selecting the type of analysis measurement may include the steps of opening a code/structure/operating system browser window and locating the suspicious area or areas of code. In addition, the user may also pull down a menu to select the type of analysis measurement and then highlight or click on the desired variable(s) in the browser window. As each variable is selected, it is preferably displayed in the active specification window on display device 1008. The software engineer may then select "execute" to start the analysis measurement and to rerun the marked code at step 1120.

When the code is rerun at step 1120, the hardware analyzer 1004 captures any relevant code markers, time stamps them and passes them back to the measurement software at step 1122. The code markers are then decoded into the mnemonics of the operating system service call and the parameters and return values are displayed to the user as a trace list in a measurements results window at step 1124. As the software engineers scrolls through this trace list, the browser window may optionally track the corresponding source routines to allow the code marker definition and placement. The user can then go back, edit his or her source file to fix a defect, and begin the cycle again if necessary. Code browsing tools may also be used as described above with respect to FIG. 2.

Further operation of the embodiment of FIGS. 9–11 is directly analogous to that described above with respect to FIGS. 2–8. Sample code for an embodiment of a system operating in accordance with the principles of FIGS. 9–11 will now be described with reference to Appendices B–D.

Appendix B is an example of the q create service call interface routine written in assembly language for the pSOS+ operating system. Such a routine is provided for each service call to the operating system kernel 902 in accordance with the invention. The routine of Appendix B is part of the marker interface library 1000 which interfaces a real-time operating system (RTOS) kernel 902 to user code 900 written, for example, in the programming language "C" on a UNIX ® workstation. Appendix B illustrates assembly language source code showing the code markers inserted into a specific real-time operating system service call by marker interface library 1000. The purpose of the code of Appendix B is to convert the parameter passing protocol from a given compiler into the parameter passing protocol expected by the specific operating system. This allows the assembly language based operating system to be accessed from a higher level coding language such as the "C" language illustrated in the example of Appendix B.

Appendix C is a code segment of user code 900 which makes various RTOS service calls. As an example, the first function call in Appendix C is the q create() function with three input parameters and a fourth output parameter. This function, q create(), is actually the "C" language interface for a pSOS+ operating system assembly language service call by the same name. When the compiler generates code for this function call it places the parameters on the system memory stack in a defined order then jumps to subroutine q create. The q create subroutine, shown in Appendix B and thus residing in the marker interface library 1000, knows how to take these parameters from the memory stack and load them into specific registers of the processor. The code marker data is then written out to the address space of the processor in the portion of the address space housing the OS marker table 1002. In the example of Appendix B, registers D2 and D5 of the 68000 processor registers are loaded from these stack parameters. Next, register D0 is loaded with a value that indicates that a q create service call is being requested.

Without use of the invention, the marker interface library 1000 would now call into the operating system kernel 902 where this particular request would be serviced by acting on the data contained in the registers. As illustrated in Appendix B, for pSOS+ this is accomplished with the "TRAP #SVCTRAP" instruction. In accordance with the invention, however, the user first writes out the data contained in the registers to the OS marker table 1002 as illustrated in Table 1 below, before the OS kernel 902 is called. Conversely, when execution returns from the OS kernel 902, the marker interface library 1000 again writes out the registers containing the output parameters and the return value to the OS marker table 1002.

TABLE 1

Example Marker Table 1002

| | | | |
|---|---|---|---|
| HPOS_Q_CREATE_Entry | DS.L | 1 | ;Area to capture parameter 1 |
| | DS.L | 1 | ;Area to capture parameter 2 |
| | DS.L | 1 | ;Area to capture parameter 3 |
| HPOS_Q_CREATE_Exit | DS.L | 1 | ;Area to capture output parameter |
| | DS.L | 1 | ;Area to capture return value |

The above section is repeated once per operating system service call. The OS marker table 1002 is also preferably configured to contain some global sections used for overall measurements. The section below is used to measure the amount of time the operating system kernel 902 takes to execute the desired service call. All service call interface library 1000 routines write to this global section when they are entering and exiting their service call.

| | | | |
|---|---|---|---|
| Start_OS_Ovrhd | DS.L | 1 | ;Indicate start of service call |
| Stop_OS_Ovrhd | DS.L | 1 | ;Indicate end of service call |

When the user code 900 is executed, every time an operating system service call is invoked some marker data is written out to the OS marker table 1002. This OS marker table 1002 may be simply a predefined memory range in the processor's address space as described above. Table 1 shows an example segment of the data area that the q create service call writes to along with the section of the OS marker table 1002 that is used for global service call measurements that all service call routines write to.

In order to capture this marker data, the invention preferably uses a traditional hardware analyzer 1004 and does not need the specialized marker collection hardware described above with respect to FIG. 6. However, the same hardware illustrated in FIG. 6 may be used in this embodiment as desired. To capture the marker data, the hardware analyzer 1004 is simply set up to monitor a range of addresses corresponding to the OS marker table 1002 or a desired subset of the OS marker table 1002. When a marker is written to that area, the hardware analyzer 1004 stores the written data and its address into the marker data buffer which in the case of a traditional hardware analyzer 1004 as illustrated in FIG. 10 is simply the analyzer's memory 1006.

Once the marker data is captured, the captured marker data is then unloaded and decoded into a form that is useful and understandable to the software engineer. The address of the captured marker data preferably indicates which operating system service call was invoked. Appendix D is an example display trace corresponding to the code segment of Appendix C as captured by a traditional emulation trace analyzer 1004 and decoded and displayed as native RTOS mnemonics. For example, in Appendix D the line that starts with "+32" shows that the q create service call was invoked. The other marker data captured for this specific invocation of the q create service call can be decoded into the input parameters for this service call and displayed as parameters:

name='p2cs', count=4, flags=B:1010 and [Export=LOCAL, Qtype=GLOBAL, Qlimit=NONE, Priv bufs=YES].

To make this display easier for the software engineer to follow his or flow of execution, the invention further displays more than just the raw parameters it captures. As illustrated in Appendix D, the name of the parameters, as documented in the operating system kernel 902 operating manual, has been included in the display. For example, the raw data 'p2cs' in ASCII characters was captured by the hardware analyzer 1004 in the OS marker table 1002 and prepended with a "name=" which is the actual name of the parameter in the terminology of the operating system kernel 902. The same is done for the "count" and "flags" parameters.

In some cases, the invention can make the display even more understandable by further decoding the marker data into special known mnemonics. For example, the "flags" parameter that is an input parameter to the q create service call actually has a finite set of acceptable values. The invention knows what this finite set is and thus decodes the data into the equivalent human readable form. In the above example for trace list line "+032" the flag value was actually 1010 in binary form. Each of these bits controls a different setting for the q create service call depending on whether it is set to a one or a zero. The leftmost bit controls the "Export" field and, since it is a 1, that indicates a setting of "LOCAL". The invention then displays this as "Export=LOCAL", which is very easy to understand by the software engineer. The remaining bit fields are decoded accordingly.

In the next line of display in Appendix D, it can be seen that the system is returning from the q create service call and that the resultant output parameter (qid=00030000) is displayed again in a very easy to understand form. In addition, any abnormal return values may also be displayed and the appropriate error message decoded. For example, the line after "+496" in Appendix D shows an example of a service call that returned an error value, including the error number and the corresponding error message.

Thus, the embodiment of FIGS. 9–11 allows the invention to be used with real-time operating systems by providing an interface to the real-time operating system which performs the function of keeping track of the code markers and outputting a trace list corresponding to a finite number of states in memory. Such a system has been shown to minimally intrude upon the performance of the operating system kernel while providing very useful debugging information to the user. Moreover, since the user may further insert his or her own code markers at the desired locations, this arrangement is quite flexible and also allows the user to display any desired parameters that are passed into the operating system kernel through the service call. Moreover, the system illustrated in FIG. 9–11 may work in any computer language or assembly based operating system without the user having to buy a special, instrumented version of the operating system from a vendor. The technique of this embodiment of the invention is thus believed to represent a significant improvement over the prior art.

As noted above, the insertion of the code markers at compile time or interactively during the debug session as herein described make visible critical points in code execution, such as function calls, task creation, semaphore operations and other resource usage. This speeds isolation of problems at test points and also allows performance analysis and event analysis without the ambiguities of microprocessor prefetch and cache operations as in the prior art. Also, by using low intrusion print statements which use code markers together with binary data transfer and a host database to move formatting out of the host system and into the debugger, it is possible to reduce the volume of data transfer required for each print. Also, when used in conjunction with a logic analyzer, the invention reduces the overhead of the debug I/O transfer to a few simple memory writes. Moreover, time tagging may be automatically added with little overhead so that time critical software may be monitored by simply inserting markers at appropriate places in the code and then measuring the time between markers during running of the program. This information may then be presented to the software engineer at a high level of abstraction for purposes of taking appropriate action without detailed knowledge of the underlying processor.

The present invention is believed to contribute to the art in the area of code marker insertion and collection by adding the ability to insert/remove code markers dynamically. Since the code markers may be inserted without recompiling the entire program, the speed of insertion/deletion is improved, and since the user interface is at a high level, the code markers may be easily inserted and deleted. Also, since the same code marker definitions are used for different code marker collection methods, the ease of switching between collection methods is facilitated. Moreover, the same method of code marker collection may be used across different language systems.

As described above, these code marker collection methods are broken down into two categories: software collection and hardware collection. In the case of hardware collection, the present invention includes a hardware analyzer which has true dual-ported marker memory, high speed marker compare and a deep code marker memory. Onboard marker reduction processors may also be used to increase throughput of the system. Software collection, on the other hand, allows a majority of measurements to be performed in a software assisted environment at a low cost. Software collection tasks are thus advantageous for on-site debugging/characterization of the software engineer's system.

Although exemplary embodiments of the invention have been described in detail above, those skilled in the art will readily appreciate that many additional modifications are possible in the exemplary embodiments without materially departing from the novel teachings and advantages of the invention. For example, the technique of the invention may be used in object-oriented software systems as well as existing logic analyzer systems. Also, a feature may be added whereby code markers are automatically inserted into the software and turned on or off prior to compiling. Such a dormant marker activator would further facilitate debugging in that the debugger can selectively concentrate on different aspects of the software system without reinserting code markers. Accordingly, all such modifications are intended to be included within the scope of the invention as defined in the following claims.

Appendix A

```
******************************************************************
*********************       SECTION III     **********************
*********************      CALLOUT ROUTINE  **********************
            SECTION code
            XDEF _SWITCH_CALLOUT TCB_NAME    EQU     48      ;Offset to task name in TCB (pSOS+)

_SWITCH_CALLOUT

MOVE.L  TCB_NAME(A4),HPOS_TASK_EXIT   ;Note task exit    ;HP-RTOS-Level-1

MOVE.L  TCB_NAME(A6),HPOS_TASK_ENTRY  ;Note task entry   ;HP-RTOS-Level-1

RTS
*********************       END SECTION III   ********************
*********************       CALLOUT ROUTINE   ********************
******************************************************************
```

Appendix B

```
*********************************************************************
*                                                                    *
* CREATE A MESSAGE QUEUE                                              *
*                                                                    *
*   rc = q_create(name, count, flags, &qid);                         *
*                                                                    *
*                                                                    *
*********************************************************************
          XDEF      _q_create
_q_create:
          LINK      A6,#0
          MOVEM.L   D2/D5,-(SP)
          MOVE.L    8(A6),A0              ;A0-> NAME
          BSR       CPYNAME               ;PUT NAME IN D1
          MOVE.L    12(A6),D2             ;D2 EQU MSG Q MAX
          MOVE.L    16(A6),D5             ;D5 EQU FLAGS

MOVEQ     #Q_CREATE,D0

MOVEM.L   D1-D2/D5,HPOS_Q_CREATE_Entry    ;HP-RTOS-Level-1
          MOVE.W    #1,Start_OS_Ovrhd               ;HP-RTOS-Level-2
          TRAP      #SVCTRAP
          MOVE.W    #2,Stop_OS_Ovrhd                ;HP-RTOS-Level-2
          MOVEM.L   D0-D1,HPOS_Q_CREATE_Exit        ;HP-RTOS-Level-1
          MOVE.W    D0,HPOS_CHECK_ERRORS            ;HP-RTOS-Level-2
          JSR       _SAVE_QUEUE_INFO                ;HP-RTOS-Level-3

MOVEA.L   20(A6),A0             ;A0->RETURN QID
          MOVE.L    D1,(A0)               ;RETURN QID
          MOVEM.L   (SP)+,D2/D5
          UNLK      A6
          RTS
```

Appendix C

```
/*********************** TASK:  root  ***************************/
/* FUNCTION */
void root()
/**/
/*  DESCRIPTION  Initialize system resources and start tasks.
/*               When done, suspend self.
/*
/*  RETURN       Nothing
/**/
{
    /* Create the queues */
    q_create("p2cs", 10, 0x04, &p2cs_qid);
    q_create("cssl",  2, 0x04, &cssl_qid);
    q_create("csbo",  2, 0x04, &csbo_qid);
    q_create("csph",  2, 0x04, &csph_qid);
    q_create("slpa",  5, 0x04, &slpa_qid);
    q_create("bopa",  5, 0x04, &bopa_qid);
    q_create("phla",  2, 0x04, &phla_qid);
    q_create("lapa",  5, 0x04, &lapa_qid);
    q_create("iopr",  2, 0x04, &iopr_qid);

/*  START processes */

/*** PRIORITY 12 ***/
    /* Create the I/O task */
    /* Don't create if the application if supposed to run 'free' */
    if (appl_uses_simio)
    {
        t_create("iotk", 12, SYS_STACK_SIZE, USER_STACK_SIZE, 0, &io_tid);
        t_start(io_tid, 0x000 | T_PREEMPT | T_TSLICE | T_NOASR | T_USER,
                input, tstart_args);
    }

/*** PRIORITY 11 ***/
    /* Create the recursive task */
```

```
t_create("recr", 9, SYS_STACK_SIZE, 0x1500, 0, &recr_tid);
tstart_args[0] = TRUE;
t_start(recr_tid, 0x000 | T_PREEMPT | T_TSLICE | T_NOASR | T_USER,
        recur_task, tstart_args);

/*** PRIORITY 10 ***/
/* Create the destination (Palo Alto) task */
t_create("paal", 10, SYS_STACK_SIZE, USER_STACK_SIZE, 0, &paloalto_tid);
t_start(paloalto_tid, 0x000 | T_PREEMPT | T_TSLICE | T_NOASR | T_USER,
        paloalto, tstart_args);

/*** PRIORITY 9 ***/
/* Create the node (Salt Lake) task */
t_create("sllk", 9, SYS_STACK_SIZE, USER_STACK_SIZE, 0, &saltlake_tid);
t_start(saltlake_tid, 0x000 | T_PREEMPT | T_TSLICE | T_NOASR | T_USER,
        node_sl, tstart_args);

/* Create the node (Boise) task */
t_create("bose", 9, SYS_STACK_SIZE, USER_STACK_SIZE, 0, &boise_tid);
t_start(boise_tid, 0x000 | T_PREEMPT | T_TSLICE | T_NOASR | T_USER,
        node_bo, tstart_args);

/* Create the node (Phoenix) task */
t_create("phnx", 9, SYS_STACK_SIZE, USER_STACK_SIZE, 0, &phoenix_tid);
t_start(phoenix_tid, 0x000 | T_PREEMPT | T_TSLICE | T_NOASR | T_USER,
        node_ph, tstart_args);

/* Create the node (LA) task */
t_create("losa", 9, SYS_STACK_SIZE, USER_STACK_SIZE, 0, &la_tid);
t_start(la_tid, 0x000 | T_PREEMPT | T_TSLICE | T_NOASR | T_USER,
        node_la, tstart_args);

/*** PRIORITY 8 ***/
/* Create the producer task */
t_create("prod", 8, SYS_STACK_SIZE, USER_STACK_SIZE, 0, &producer_tid);
t_start(producer_tid, 0x000 | T_PREEMPT | T_TSLICE | T_NOASR | T_USER,
        producer, tstart_args);

/* Create the main router (Colorado Springs) task */
t_create("cosp", 8, SYS_STACK_SIZE, USER_STACK_SIZE, 0, &mainrouter_tid);
t_start(mainrouter_tid, 0x000 | T_PREEMPT | T_TSLICE | T_NOASR | T_USER,
        mainroute, tstart_args);

/*** PRIORITY 7 ***/
/* Create the idle-loop task */
t_create("idlp", 7, SYS_STACK_SIZE, USER_STACK_SIZE, 0, &idleloop_tid);
t_start(idleloop_tid, 0x000 | T_PREEMPT | T_NOASR, idle_loop, tstart_args);
```

M68302 Appendix D

```
Trace List              Offset=0                      More data off screen
Label:                  Real Time Operating System              time count
Base:                        with symbols                       relative
-------    --------------------------------------------------   -----------
after      NON-RTOS:  addr=1EFFA  data=00002700
+001       STACKS: 'ROOT'  Supr size=00000000  User size=00000000    2.15   S
                           ptr=00026284        ptr=00026288
+011       STACK BYTES LEFT ON EXIT:  Supr 00000000  User 00000000   106.   uS
+019       ---EXITING TASK : 'ROOT'-----------------------------    8.76   uS
+021       ---ENTERING TASK: 'ROOT'-----------------------------    7.24   uS
+023     . STACK BYTES LEFT ON ENTRY: Supr 00000000  User 00000000   2.3    uS
+031          <CLOCK TICK>                                          96.0   uS
+032       -> q_create(name='p2cs',count=4,flags=B:1010             218.   uS
              [Export=LOCAL,Qtype=GLOBAL,Qlimit=NONE,Priv_bufs=YES])
+038       <- q_create(qid=00030000)                                167.   uS
+042       -> q_create(name='cssl',count=4,flags=B:10               51.12  uS
              [Export=LOCAL,Qtype=GLOBAL,Qlimit=NONE,Priv_bufs=NONE])
+048       <- q_create(qid=00040000)                                167.   uS
+052       -> q_create(name='csbo',count=4,flags=B:10               54.64  uS
              [Export=LOCAL,Qtype=GLOBAL,Qlimit=NONE,Priv_bufs=NONE])
+058       <- q_create(qid=00050000)                                167.   uS
+062       -> q_create(name='csph',count=4,flags=B:10               58.12  uS
              [Export=LOCAL,Qtype=GLOBAL,Qlimit=NONE,Priv_bufs=NONE])
+068       <- q_create(qid=00060000)                                168.   uS
```

```
+072    -> q_create(name='slpa',count=4,flags=B:101              61.64  uS
           [Export=GLOBAL,Qtype=FIFO,Qlimit=YES,Priv_bufs=NONE])
+078    <- q_create(qid=00070000)                                167.   uS
+082    -> q_create(name='bopa',count=4,flags=B:101              65.12  uS
           [Export=GLOBAL,Qtype=FIFO,Qlimit=YES,Priv_bufs=NONE])
+088         <CLOCK TICK>                                        21.5   uS
+089    <- q_create(qid=00080000)                                283.   uS
+093    -> q_create(name='phla',count=4,flags=B:10               68.64  uS
           [Export=LOCAL,Qtype=GLOBAL,Qlimit=NONE,Priv_bufs=NONE])
+099    <- q_create(qid=00090000)                                168.   uS
+103    -> q_create(name='lapa',count=4,flags=B:101              72.12  uS
           [Export=GLOBAL,Qtype=FIFO,Qlimit=YES,Priv_bufs=NONE])
+109    <- q_create(qid=000A0000)                                158.   uS
+113    -> q_create(name='iopr',count=4,flags=B:10               75.60  uS
           [Export=LOCAL,Qtype=GLOBAL,Qlimit=NONE,Priv_bufs=NONE])
+119    <- q_create(qid=000B0000)                                167.   uS
+123    -> t_create(name='iotk',pri=12,mss=00000400,             86.6   uS
           uss=00000200,flags=0[Export=LOCAL,FPU Use=NO])
+133    <- t_create(tid=000C0000)                                456.   uS
+137    -> t_start(Tid=000C0000,mode=0006H,addr=prog|input.input, 28.2  uS
           args=[FBFFEAFF,AFBFEBBF,EBFFFBFF,FBFFEFFF])
+151    STACKS: 'iotk'  Supr size=00000400  User size=00000200   121.   uS
                ptr=000263D4        ptr=000263D8
+161    <- t_start()                                             94.1   uS
+163    -> t_create(name='recr',pri=9,mss=00000400,              34.1   uS
           uss=00001500,flags=0[Export=LOCAL,FPU Use=NO])
+173    <- t_create(tid=000D0000)                                487.   uS
+177    -> t_start(Tid=000D0000,mode=0006H,addr=|root.recur_task, 29.8 uS
           args=[00000001,AFBFEBBF,EBFFFBFF,FBFFEFFF])
+191    STACKS: 'recr'  Supr size=00000400  User size=00001500   165.   uS
                ptr=00026524        ptr=00026528
+201    <- t_start()                                             94.1   uS
+203    -> t_create(name='paal',pri=10,mss=00000400,             33.9   uS
           uss=00000200,flags=0[Export=LOCAL,FPU Use=NO])
+213         <CLOCK TICK>                                        112.   uS
+214    <- t_create(tid=000E0000)                                486.   uS
+218    -> t_start(Tid=000E0000,mode=0006H,addr=pr|dest.paloalto, 28.3 uS
           args=[00000001,AFBFEBBF,EBFFFBFF,FBFFEFFF])
+232    STACKS: 'paal'  Supr size=00000400  User size=00000200   132.   uS
                ptr=00026674        ptr=00026678
+242    <- t_start()                                             94.1   uS
+244    -> t_create(name='sllk',pri=9,mss=00000400,              33.9   uS
           uss=00000200,flags=0[Export=LOCAL,FPU Use=NO])
+254    <- t_create(tid=000F0000)                                463.   uS
+258    -> t_start(Tid=000F0000,mode=0006H,addr=|node_sl.node_sl, 28.2 uS
           args=[00000001,AFBFEBBF,EBFFFBFF,FBFFEFFF])
+272    STACKS: 'sllk'  Supr size=00000400  User size=00000200   136.   uS
                ptr=000267C4        ptr=000267C8
+282    <- t_start()                                             94.1   uS
+284    -> t_create(name='bose',pri=9,mss=00000400,              33.6   uS
           uss=00000200,flags=0[Export=LOCAL,FPU Use=NO])
+294    <- t_create(tid=00100000)                                467.   uS
+298    -> t_start(Tid=00100000,mode=0006H,addr=|node_bo.node_bo, 28.0 uS
           args=[00000001,AFBFEBBF,EBFFFBFF,FBFFEFFF])
+312    STACKS: 'bose'  Supr size=00000400  User size=00000200   146.   uS
                ptr=00026914        ptr=00026918
+322    <- t_start()                                             94.1   uS
+324    -> t_create(name='phnx',pri=9,mss=00000400,              33.6   uS
           uss=00000200,flags=0[Export=LOCAL,FPU Use=NO])
+334         <CLOCK TICK>                                        474.   uS
+335    <- t_create(tid=00110000)                                189.   uS
+339    -> t_start(Tid=00110000,mode=0006H,addr=|node_ph.node_ph, 28.0 uS
           args=[00000001,AFBFEBBF,EBFFFBFF,FBFFEFFF])
+353    STACKS: 'phnx'  Supr size=00000400  User size=00000200   156.   uS
                ptr=00026A64        ptr=00026A68
+363    <- t_start()                                             94.1   uS
+365    -> t_create(name='losa',pri=9,mss=00000400,              33.8   uS
           uss=00000200,flags=0[Export=LOCAL,FPU Use=NO])
+375    <- t_create(tid=00120000)                                475.   uS
+379    -> t_start(Tid=00120000,mode=0006H,addr=|node_la.node_la, 28.2 uS
           args=[00000001,AFBFEBBF,EBFFFBFF,FBFFEFFF])
+393    STACKS: 'losa'  Supr size=00000400  User size=00000200   166.   uS
                ptr=00026BB4        ptr=00026BB8
```

```
+403      <- t_start()                                                    94.1   uS
+405      -> t_create(name='prod',pri=8,mss=00000400,                     33.6   uS
             uss=00000200,flags=0[Export=LOCAL,FPU Use=NO])
+415      <- t_create(tid=00130000)                                       481.   uS
+419      -> t_start(Tid=00130000,mode=0006H,addr=produce.producer,       28.0   uS
             args=[00000001,AFBFEBBF,EBFFFBFF,FBFFEFFF])
+433      STACKS: 'prod'  Supr size=00000400  User size=00000200          183.   uS
                          ptr=00026D04         ptr=00026D08
+443      <- t_start()                                                    94.1   uS
+445      -> t_create(name='cosp',pri=8,mss=00000400,                     33.9   uS
             uss=00000200,flags=0[Export=LOCAL,FPU Use=NO])
+455      <- t_create(tid=00140000)                                       484.   uS
+459      -> t_start(Tid=00140000,mode=0006H,addr=mainro.mainroute,       28.2   uS
             args=[00000001,AFBFEBBF,EBFFFBFF,FBFFEFFF])
+473            <CLOCK TICK>                                              92.2   uS
+474      STACKS: 'cosp'  Supr size=00000400  User size=00000200          175.   uS
                          ptr=00026E54         ptr=00026E58
+484      <- t_start()                                                    152.   uS
+486      -> t_create(name='idlp',pri=7,mss=00000400,                     33.9   uS
             uss=00000200,flags=0[Export=LOCAL,FPU Use=NO])
+496      <- t_create(tid=00150000)                                       308.   uS
          ** Error code=15: NO STACK SPACE
+500      -> t_start(Tid=00150000,mode=0004H,addr=00040004,               28.0   uS
             args=[00000001,AFBFEBBF,EBFFFBFF,FBFFEFFF])
```

We claim:

1. A system for dynamically characterizing and debugging a software system including embedded software and a user program, said embedded software processing input parameters provided in service calls from said user program and returning processed output parameters to said user program, said system comprising:
   a code marker memory for storing code markers representing characterizing and debugging information of said software system;
   means, called by said user program during a service call to said embedded software, for writing at least said input and output parameters to said code marker memory as said code markers during at least entry and exit of said embedded software during said service call;
   means for reading said code markers from said code marker memory after execution of said software system; and
   means for displaying to a user at least the characterizing and debugging information associated with the read code markers in a format readily understandable by the user.

2. A system as in claim 1, further comprising means responsive to said embedded software for writing code marker data to said code marker memory indicating what software task is being exited and what task is being entered when said embedded software changes software tasks during execution of said software system.

3. A system as in claim 1, wherein said embedded software comprises an embedded real-time operating system having an operating system kernel.

4. A system as in claim 1, further comprising an analyzer memory for storing code markers read from said reading means prior to display by said displaying means.

5. A system as in claim 4, wherein said code marker memory comprises limited address space of a microprocessor of a computer upon which said software system is executed.

6. A system as in claim 5, wherein said reading means comprises a hardware analyzer which reads data stored in said limited address space of said microprocessor and stores the read data in said analyzer memory.

7. A system as in claim 6, wherein said displaying means comprises means for displaying said data stored in said analyzer memory in a native form of said service call to said embedded software.

8. A method of dynamically characterizing and debugging a software system including embedded software and a user program, said embedded software processing input parameters provided in service calls from said user program and returning processed output parameters to said user program, comprising the steps of:
   writing at least said input and output parameters as code markers to a code marker memory during at least entry and exit of said embedded software during each service call by said user program to said embedded software, said code markers representing characterizing and debugging information of said software system;
   reading said code markers from said code marker memory after execution of said software system; and
   displaying at least the characterizing and debugging information associated with the read code markers to a user in a format readily understandable by the user.

9. A method as in claim 8, comprising the further step of writing code marker data to said code marker memory indicating what software task is being exited and what task is being entered when said embedded software changes software tasks during execution of said software system.

10. A method as in claim 9, comprising the further step of time stamping the code markers written to said code marker memory during execution of said software system.

11. A method as in claim 10, comprising the further step of calculating the time spent in each software task in accordance with the time stamps on said time stamped code markers.

12. A method as in claim 8, comprising the further step of storing code markers read in said reading step prior to display in said displaying step.

13. A method as in claim 12, wherein said storing step includes the step of storing said code markers in a limited portion of address space of a microprocessor of a computer upon which said software system is executed.

14. A method as in claim 13, wherein said displaying step comprises the step of displaying said stored code markers in a native form of said service call to said embedded software.

15. A method as in claim 8, comprising the further step of time stamping the code markers written to said code marker memory during execution of said software system.

16. A method as in claim 15, comprising the further step of calculating the time spent in each service call to said embedded software in accordance with the time stamps on said time stamped code markers.

* * * * *